Figure 1:
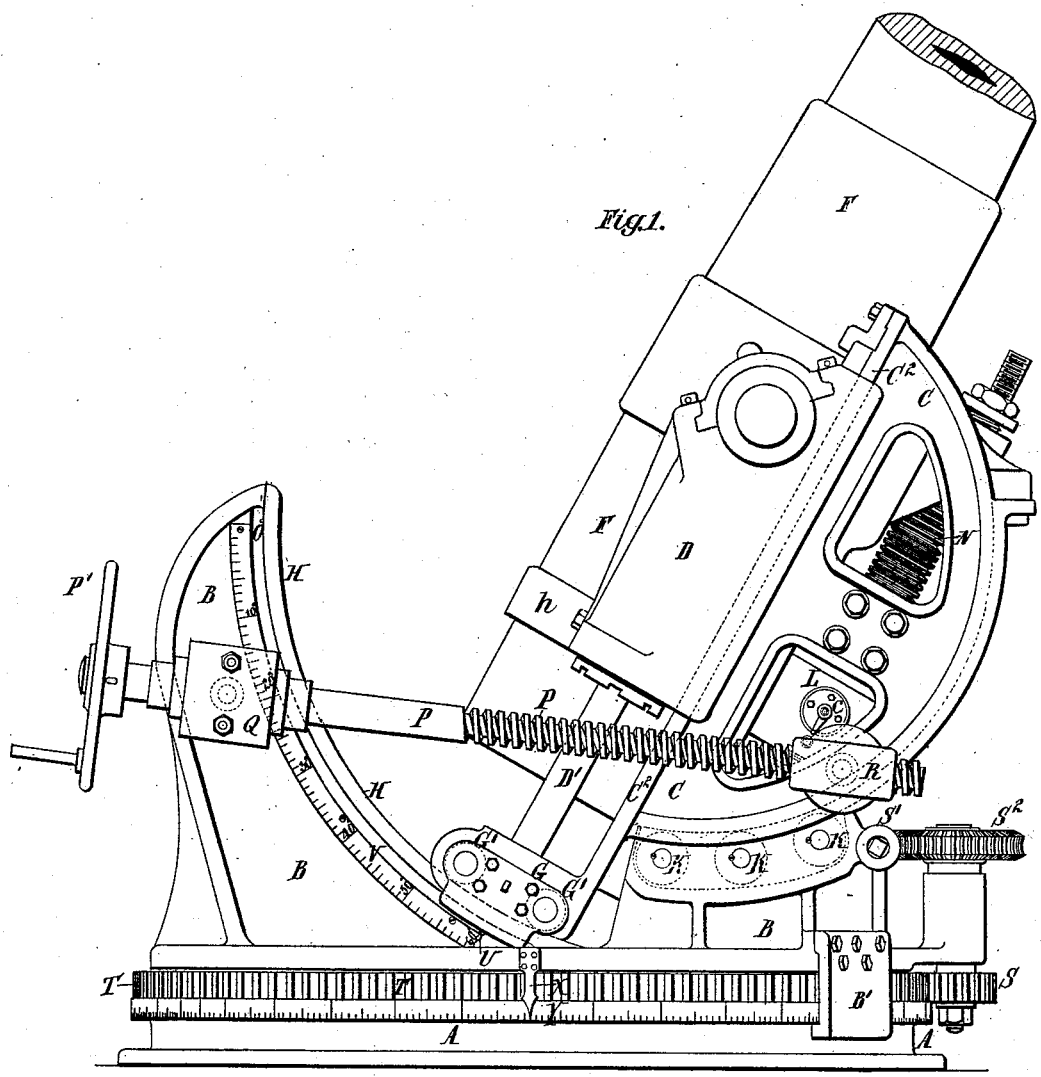

(No Model.)

12 Sheets—Sheet 1.

J. B. G. A. CANET.
GUN CARRIAGE.

No. 410,968.

Patented Sept. 10, 1889.

(No Model.) 12 Sheets—Sheet 2.
J. B. G. A. CANET.
GUN CARRIAGE.
No. 410,968. Patented Sept. 10, 1889.
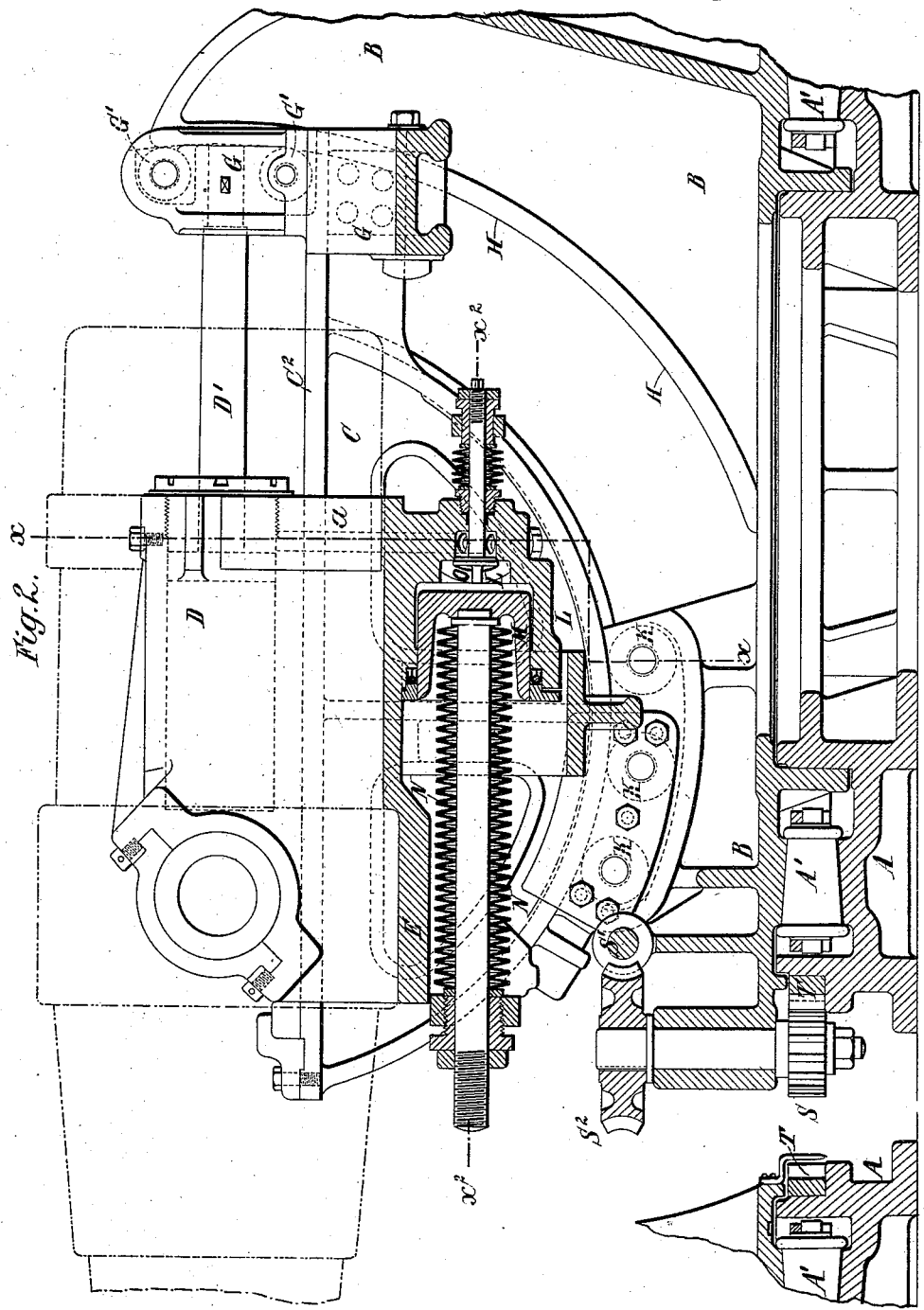
Witnesses
J. A. Rutherford.
Robert Everett
Inventor
Jean B. G. A. Canet.
By James L. Norris
Atty.

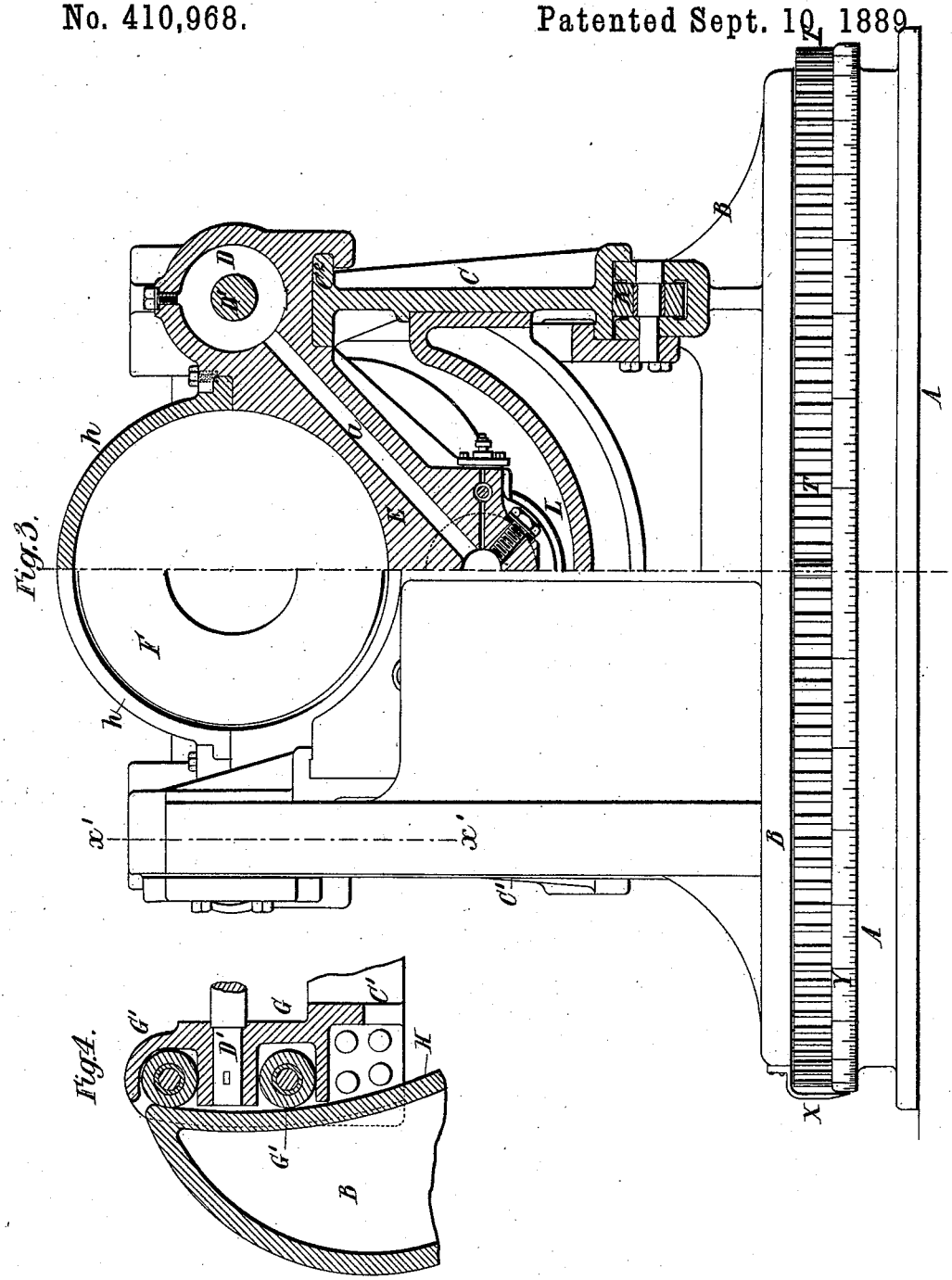

(No Model.)

J. B. G. A. CANET.
GUN CARRIAGE.

No. 410,968. Patented Sept. 10, 1889.

12 Sheets—Sheet 4.

Witnesses.
J. A. Rutherford,
Robert Everett.

Inventor.
Jean B. G. A. Canet.
By James L. Norris.
Atty.

(No Model.)  12 Sheets—Sheet 5.

J. B. G. A. CANET.
GUN CARRIAGE.

No. 410,968. Patented Sept. 10, 1889.

Witnesses.
J. A. Rutherford.
Robert Everett.

Inventor:
Jean B. G. A. Canet.
By James L. Norris
Atty.

(No Model.) 12 Sheets—Sheet 6.
J. B. G. A. CANET.
GUN CARRIAGE.

No. 410,968. Patented Sept. 10, 1889.

Witnesses:
J. A. Rutherford
Robert Everett

Inventor
Jean B. G. A. Canet,
By James L. Norris
Atty.

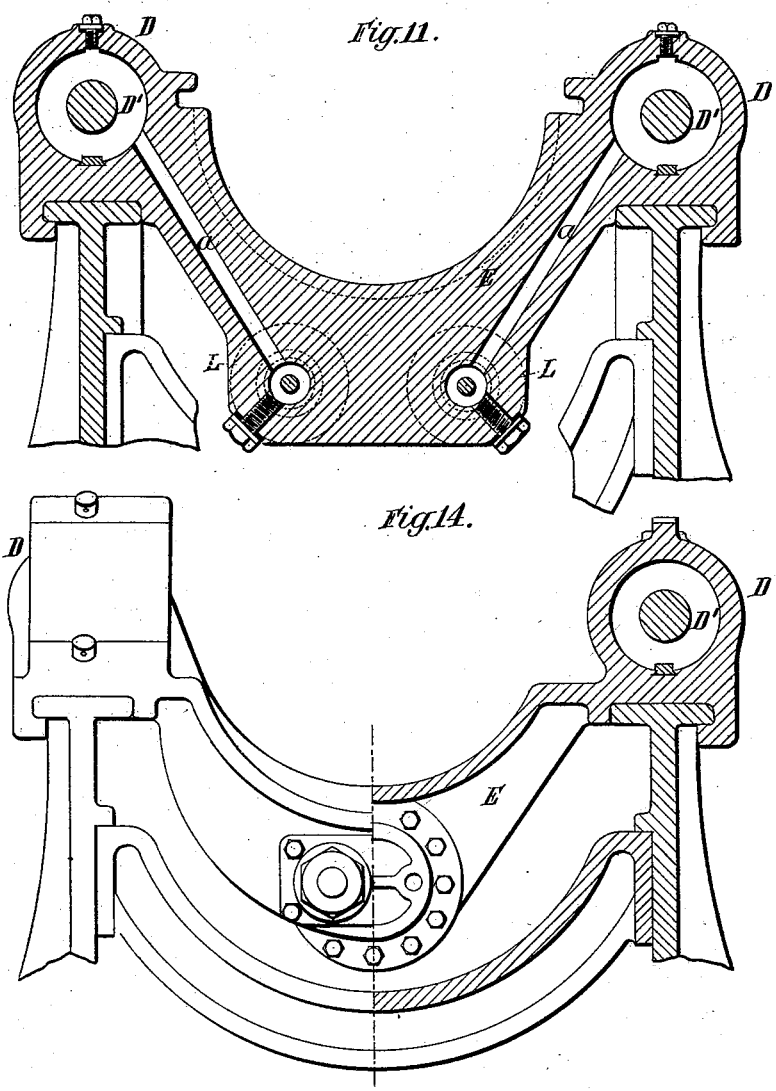

(No Model.) 12 Sheets—Sheet 8.
J. B. G. A. CANET.
GUN CARRIAGE.
No. 410,968. Patented Sept. 10, 1889.
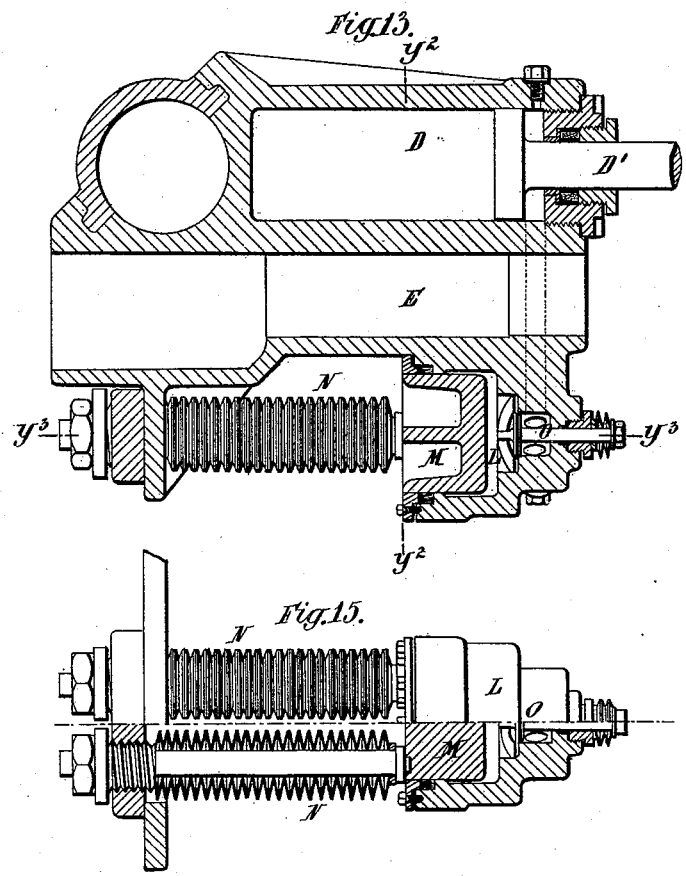

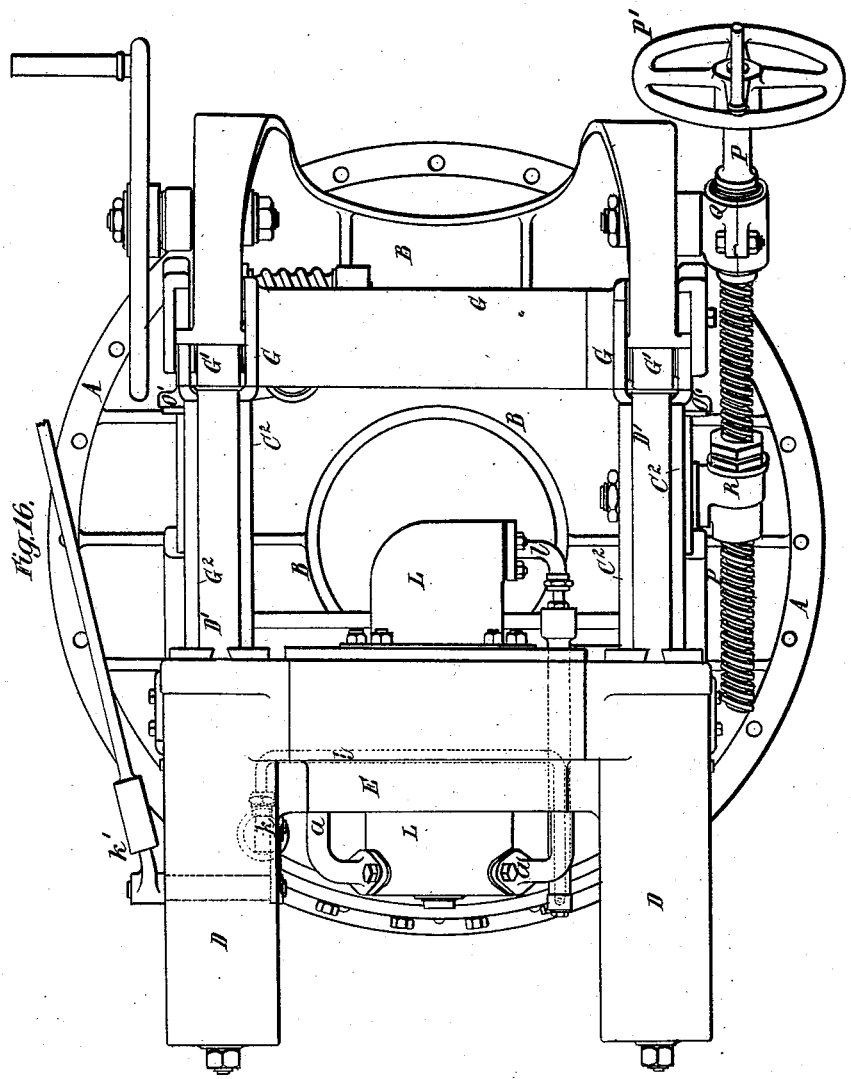

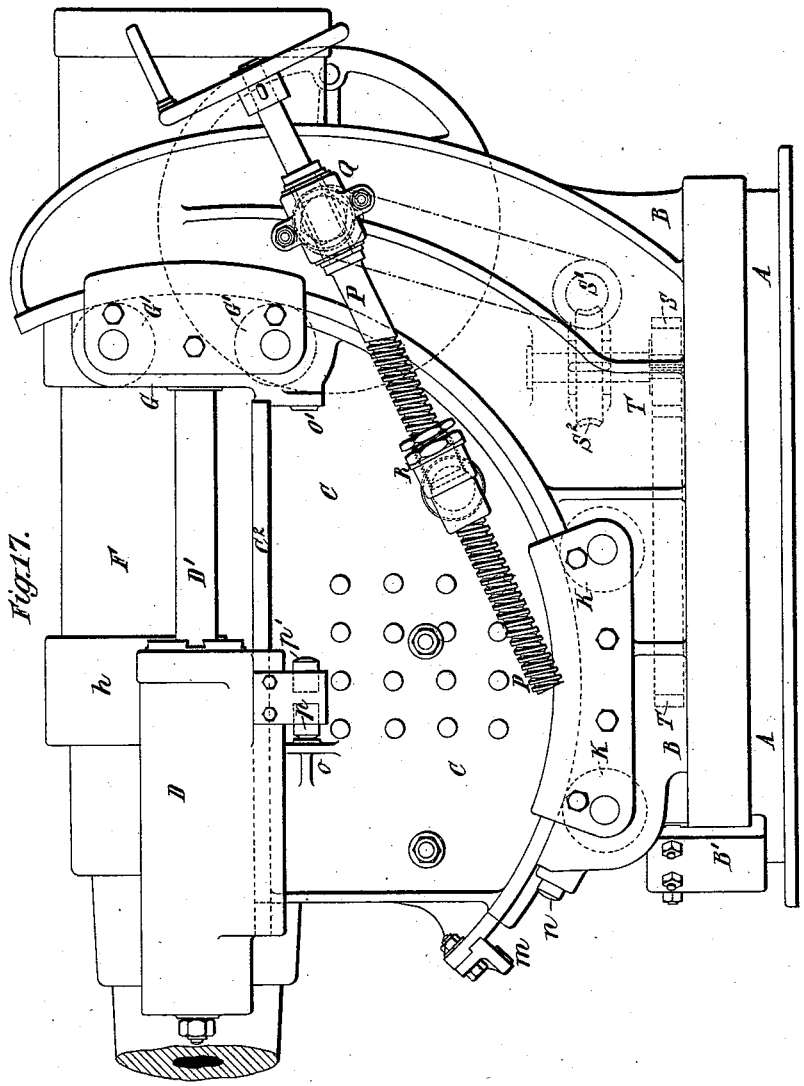

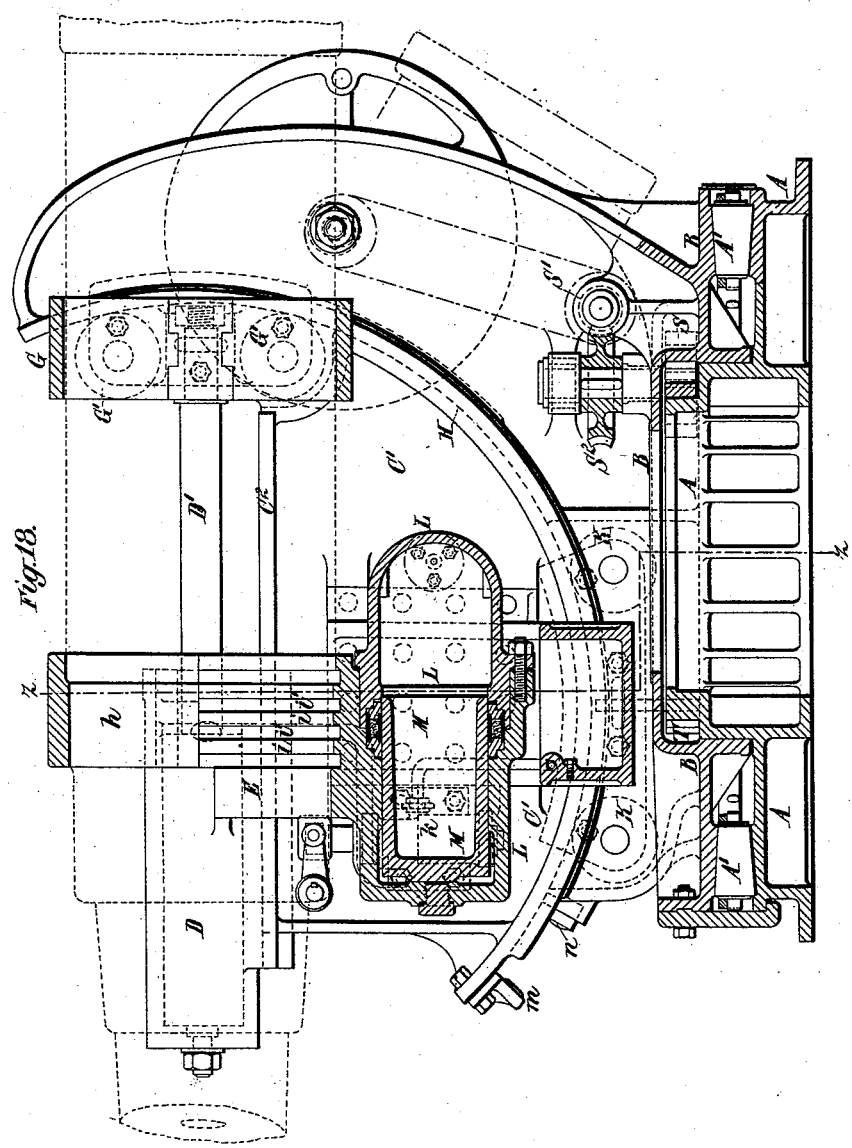

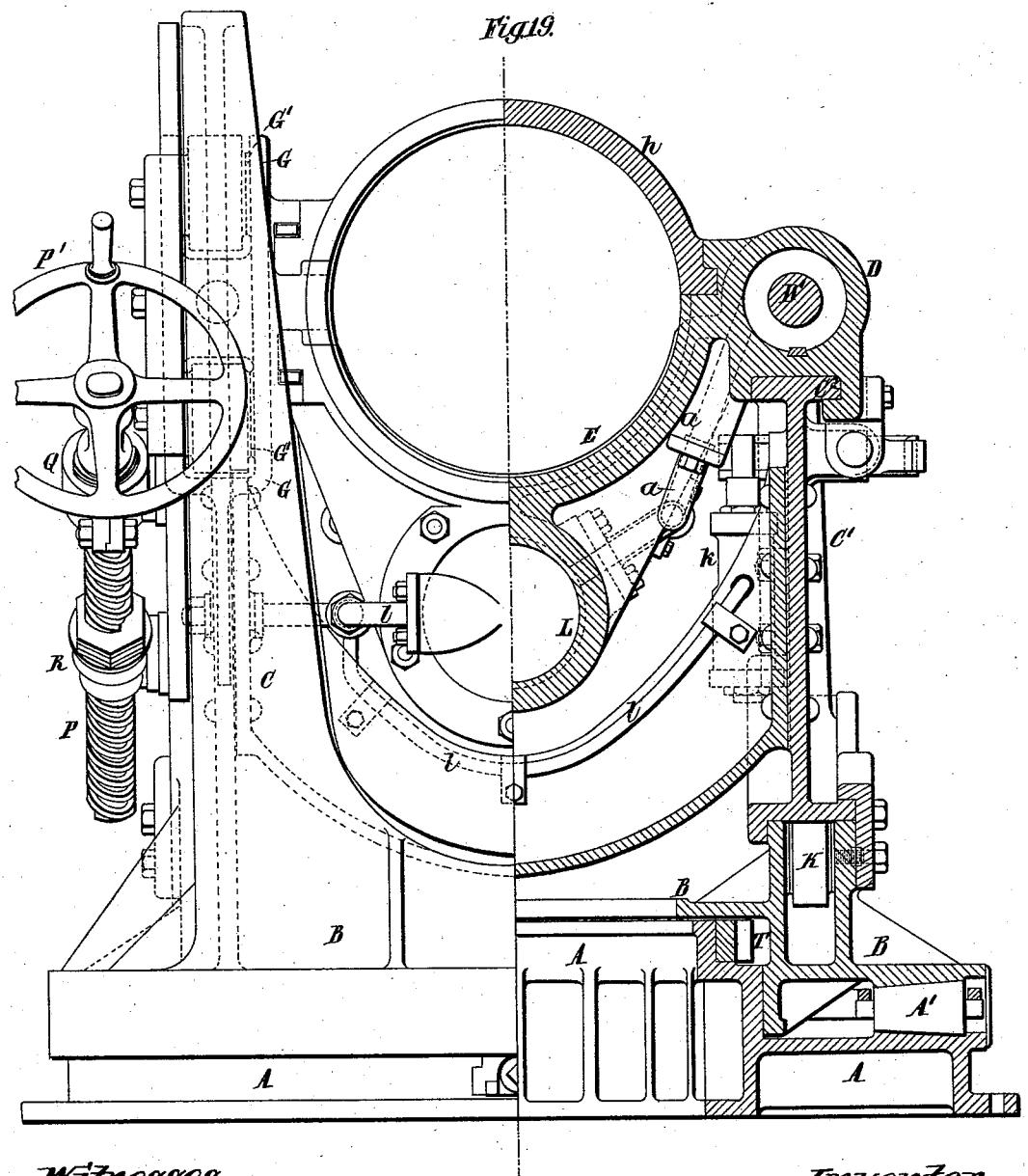

UNITED STATES PATENT OFFICE.

JEAN BAPTISTE GUSTAVE ADOLPHE CANET, OF PARIS, FRANCE, ASSIGNOR OF ONE-HALF TO SIR JOSEPH WHITWORTH & CO., (LIMITED,) OF MANCHESTER, ENGLAND.

GUN-CARRIAGE.

SPECIFICATION forming part of Letters Patent No. 410,968, dated September 10, 1889.

Application filed July 11, 1888. Serial No. 279,692. (No model.) Patented in France July 3, 1885, No. 169,921, and in England July 2, 1887, No. 9,427.

*To all whom it may concern:*

Be it known that I, JEAN BAPTISTE GUSTAVE ADOLPHE CANET, engineer, a citizen of the Republic of France, and a resident of Paris, France, have invented new and useful Improvements in Gun Carriages or Mountings (for which I have obtained patents in Great Britain, No. 9,427, dated July 2, 1887, and in France, No. 169,921, dated July 3, 1885,) of which the following is a specifiation, reference being had to the accompanying drawings.

This invention relates chiefly to a gun carriage or mounting wherein the gun is rigidly secured in a cradle fitted to slide in or upon a segmental frame or top carriage, which is formed with and moves on bearing-surfaces in the arc of a circle for elevating the gun, and which has in the chord of the arc a bearing-surface or slide whereon the cradle with the gun, in the recoil, always moves against resistance in a line coinciding with the longitudinal axis of the gun and intersecting the center of the circle. Therefore, whatever may be the angle of elevation, the force of the recoil and the resistance thereto are exerted in, or along, or parallel to this line—that is to say, the thrusts or stresses due to the recoil are always directly upon and resisted by the parts of the structure immediately behind the breech of the gun or the cradle, and indirect or oblique stresses upon the mounting are avoided, so that the required strength of the parts is obtained without great weight of metal. This form of gun carriage or mounting is chiefly designed for breech-loading guns.

The said invention affords the means for constructing a compact and efficient gun-mounting for howitzers and other guns to be fired at a very high elevation. These gun carriages or mountings can be advantageously employed for land or sea service for guns of any caliber.

Figure 5:
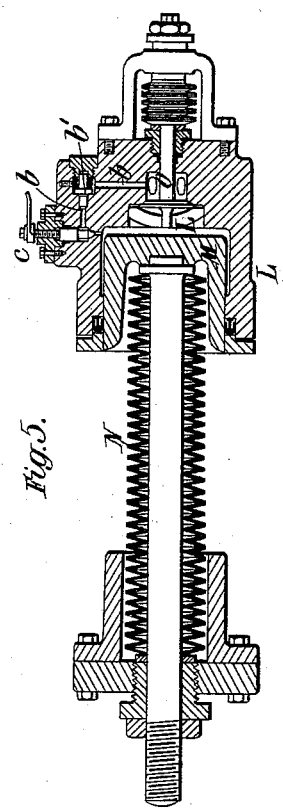
Figure 8:
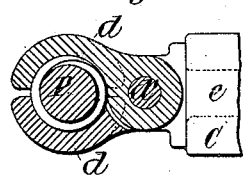
Figure 9:
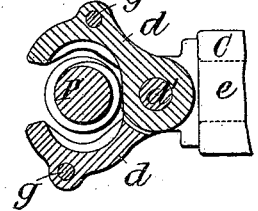
Figure 10:
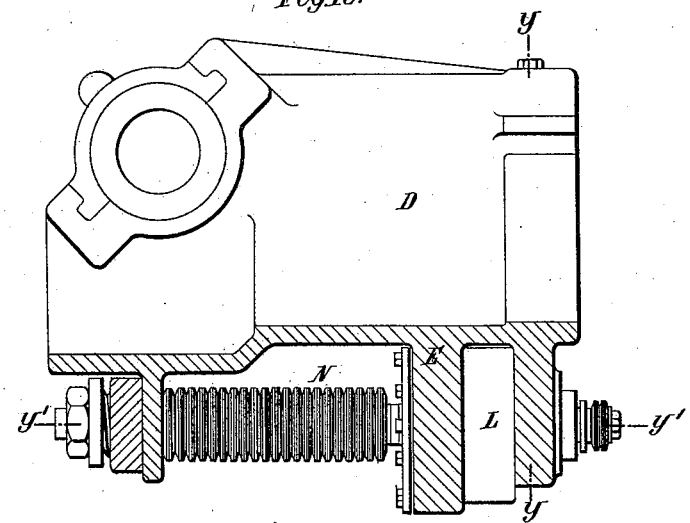
Figure 12:
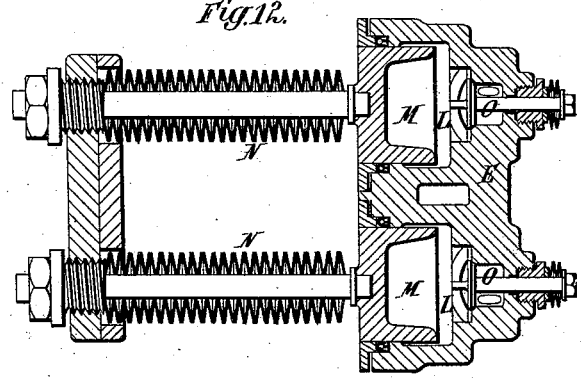

In the accompanying drawings, Figure 1 is an elevation of one side of a gun carriage or mounting constructed according to my said invention, the gun being shown in a firing position. Fig. 2 is a vertical longitudinal central section, drawn to an enlarged scale, of the said carriage or mounting, the gun being shown in dotted lines in the loading and another firing position. Fig. 3 is partly a rear elevation and partly a transverse section on the line $x\,x$, Fig. 2, also drawn to an enlarged scale, some of the parts being removed. Fig. 4 is a vertical longitudinal section on the line $x'\,x'$, Fig. 3, showing details of construction. Fig. 5 is a horizontal section on the line $x^2\,x^2$, Fig. 2. Figs. 6, 7, 8, and 9 are views illustrating a device for permitting the return of the gun to the loading position under the action of gravity, as hereinafter explained. Fig. 10 is a vertical longitudinal central section illustrating a modification of my invention. Fig. 11 is a transverse section on the line $y\,y$, Fig. 10. Fig. 12 is a horizontal section on the line $y'\,y'$, Fig. 10. Fig. 13 is partly a vertical longitudinal central section and partly a section through the center of one of the brake-cylinders, illustrating another modification of my said invention. Fig. 14 is partly a front elevation and partly a transverse section on the line $y^2\,y^2$, Fig. 13. Fig. 15 is partly an under side view and partly a horizontal section on the line $y^3\,y^3$, Fig. 13. Fig. 16 is a plan, Fig. 17 a side elevation, and Fig. 18 a vertical longitudinal central section, illustrating a further modification of my said invention. Fig. 19 is partly a rear elevation and partly a transverse section on the line $z\,z$, Fig. 18, drawn to an enlarged scale.

Like letters indicate corresponding parts throughout the drawings.

A is the base-plate or racer.

B is the turn-table, frame, or under carriage, which is supported thereon through the medium of rollers (or balls) A', and is securely held and kept from tilting by means of hooks or clips B'.

C C' are the sides or cheeks of the gun-mounting proper or top carriage. Each of these cheeks has the form of a circular segment, along the chord of which is a flanged face or slide C². The flanges or slides C² serves as guides for the recoil-brake cylinders D, which are rigidly connected by a transom E, forming a cradle in which the gun F is supported and held by a strap $h$ or otherwise.

The recoil-brake piston-rods D' are firmly secured in brackets or supporting-pieces G, formed with or attached to the cheeks C C' at the rear end thereof. These supporting-pieces are provided with rollers G', arranged to travel upon the segmental roller-paths H of the turn-table or under carriage B. Other rollers K are combined with the said turn-table or under carriage for supporting the sides or cheeks C C'.

The recoil-brake cylinders D communicate, by means of pipes or passages $a$, with a third cylinder L, formed with or firmly attached to the transom E, and containing liquid. This cylinder has a piston M, which is subjected to the action of a spring N, (preferably a so-called "Belleville" spring,) or of compressed air, so that it will keep under pressure the whole volume of liquid contained in the three cylinders, and will act as a recuperator for effecting the running out or return of the gun to the firing position.

The cylinder L is provided with a loaded valve O, which will be lifted or forced from its seat during the recoil and will return to its seat on the termination thereof. The cylinder L is, moreover, connected with the pipes or passages $a$ by a by pass or passage $b$, provided with a check-valve $b'$. An adjustable valve $c$ is provided, whereby this passage $b$ may be closed or the extent of its opening regulated at will.

It will be seen that in the case of a breech-loading gun the arrangement of the recuperators herein described affords ready access for loading.

A screw-shaft P, having fixed thereon a hand-wheel P', is provided for effecting the vertical pointing or elevation of the gun. The neck of this screw-shaft turns in a bearing or sleeve Q, secured to the under carriage B, and the screw-threaded part of the said shaft works in a nut R, secured to the side or cheek C of the top carriage. The said bearing Q and nut R are arranged to turn on pins or pivots, to permit the requisite angular changes of position of the elevating-screw P throughout the movements of the top carriage, and thus allow the said screw to act properly with any degree of elevation of the gun.

The turn-table or under carriage B is arranged to be rotated by means of a toothed pinion S, geared with a circular rack T on the base-plate or racer A, and operated by means of a worm S' and worm-wheel S² by a chain and pitch wheel, or other suitable means are provided for rotating the said turn-table or under carriage.

In the gun-mounting illustrated in Figs. 1 to 5 a hand or pointer U is attached to one of the pieces G to indicate upon a graduated scale V on the turn-table or under carriage B the angle of elevation of the gun. A hand or pointer X is, moreover, attached to the turn-table or under carriage B for indicating upon a graduated scale Y on the base-plate or racer A the angle through which the gun moves when traversed or trained.

The operation of the apparatus illustrated in Figs. 1 to 5 is as follows, viz: In the recoil the liquid displaced from the brake-cylinders D is forced through the passages $a$ into the cylinder L, and acting upon the piston M compresses the spring N, thereby storing up energy for effecting the running out or return of the gun to the firing position. The valve O is opened by the liquid as it enters the cylinder L and closes at the termination of the recoil. The said liquid can only return to the brake-cylinders D through the by pass or passage $b$ when the valve $c$ is opened. This passage is made small enough to insure a slow return movement of the gun to the firing position. Moreover, the velocity of this movement can be very accurately regulated or determined by the adjustment of the valve $c$. The gun and top carriage can be moved into the loading position (indicated in Fig. 2) by turning the screw-shaft P by means of the hand-wheel P' in one direction, and can be moved back to the firing position (indicated in Fig. 1) by turning the said hand-wheel in the reverse direction.

It will be seen that the bearing surfaces or slides C² on which the cradle moves extend to equal, or about equal, distances on either side of the center about which the top carriage moves for elevating the gun, therefore the center of gravity of the carriage and (in the case of short guns) of the gun also will be within the base or support of the said top carriage and the elevation of the gun can be effected with very little power.

If the energy accumulated in the spring N during the recoil is not sufficient to raise the gun when the top carriage is in the position shown in Fig. 1, the running out or return movement of the gun will not be completed until the said carriage is moved to, or nearly to, the position shown in Fig. 2.

If the center of gravity of the gun when run out by the recuperator is forward of the center of movement of the top carriage, the gun will gravitate to the loading position—that is to say, the gun and top carriage will tend to return to the loading position under the action of gravity. This automatic return is, however, prevented by the elevating mechanism.

Figure 6:
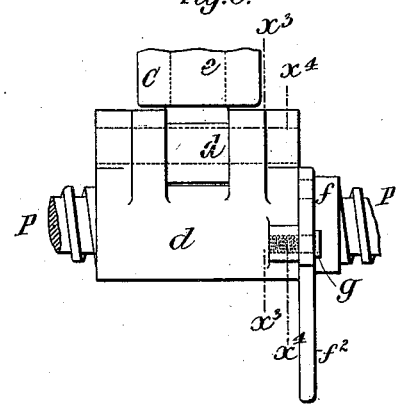
Figure 7:
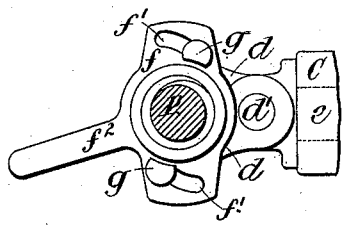

I sometimes provide for permitting the automatic return of the gun and top carriage to the loading position by the release or disconnection of the same from the elevating mechanism. I accomplish this result, for instance, by the employment of the device shown in Figs. 6 to 9. This device comprises two half nuts or jaws $d$, which are pivoted at $d'$ to a pin or bolt $e$, fitted to turn in a bearing in the cheek C. Fig. 6 is a plan of the said device, showing also part of the elevating-shaft. Fig. 7 is an end elevation of the said device, showing the elevating-shaft in transverse section. Fig. 8 is a transverse section on the line $x^3 x^3$, Fig. 6, showing the said jaws closed, and Fig. 9 is a transverse section on the line $x^4 x^4$, Fig. 6, showing the said jaws open. The jaws $d$ are adapted to engage with the elevating-shaft P and take the place of the nut R, above described. A cam $f$ is connected with the said jaws by means of screws $g$, passing through slots $f'$ in the said cam. This cam is provided with a lever or handle $f^2$, whereby it may be turned upon or about its axis to open and close the said jaws. To elevate the gun, the said jaws are caused to engage with the shaft P, and the said shaft is then rotated in the proper direction. To permit the return of the gun to the loading position, the jaws are opened, and thus disengage from the shaft P, so that it can move endwise freely between them. The gun and top carriage are retained in position during the loading by means of a locking-bolt or other suitable device.

In some instances I so arrange the gun that when loaded the center of gravity of the mass—that is to say, of the top carriage and the gun with the projectile and powder-charge therein—will be in rear of the center of movement of the top carriage, and the gun will gravitate to its firing angle, so that unless held by the said locking-bolt otherwise, it will be elevated or brought to a firing angle by gravity. In this case an adjustable stop should be provided on the elevating-screw or other convenient part of the mounting to insure the return of the gun to the same firing angle after it has been fired and reloaded. The working of the gun in this case is effected as follows—that is to say, when the gun after being fired has recoiled and been run out by the recuperator, it is disconnected from the elevating mechanism, as above described, and the muzzle end of the gun preponderating the gun and top carriage return to the loading position under the action of gravity. They are retained in this position during the loading by means of the locking-bolt. When the gun is loaded, the locking-bolt is withdrawn and the breech end of the gun preponderating the gun is elevated, under the action of gravity, until its movement is arrested by the aforesaid stop. By the construction and arrangement of the gun and gun-mounting in this manner I provide for greatly facilitating the working of the gun.

To insure the accumulation of the requisite amount of energy to automatically run out the gun after its recoil, so that it may return automatically to the loading position, two recuperators, each comprising a cylinder L, spring N, and other parts hereinbefore described, are sometimes employed, as shown in Figs. 10, 11, and 12; or the number or strength of the recuperator-springs is augmented. This automatic running out of the gun and movement thereof from the firing angle to the loading position, and vice versa, can be provided for in carriages or mountings for guns to be fired at small angles of elevation, wherein the cheeks do not serve as trunnions for permitting the elevation or depression of the gun, such elevation or depression being given to the gun about its trunnions, and suitable means being provided for releasing the elevating-gear. For instance, I sometimes adopt the construction shown in Figs. 13, 14, and 15. In this case I employ an ordinary frame or under carriage having slides of slight inclination, upon which is supported the top carriage, consisting of the hydraulic brake-cylinders D, rigidly connected by the transom E.

The gun is arranged to be adjusted vertically by means of a suitable device which causes it to turn upon or about its trunnions. Ordinary elevating-gear, comprising a segmental rack and pinion actuated by a worm and worm-wheel, may be used; or either of the forms of elevating mechanism described in the specification of another application filed by me for Letters Patent of the United States. Suitable means must, however, be provided for releasing the said mechanism and disconnecting it from the gun when required.

The extremity of each piston-rod D' bears against or is secured in a bracket or abutment at the extremity of the slide.

A recuperator-cylinder L, for effecting the running out or return of the gun to the firing position, is provided in the carriage between the said brake-cylinders and below the gun. Its piston M is loaded by springs N. During the recoil the liquid forced from the brake-cylinders D enters the third cylinder L through suitable channels, lifting the valve O and forcing back the piston M and compressing the springs N. At the termination of the recoil the liquid under pressure inclosed in the cylinder L is forced out through a small orifice in the valve or through a by-pass, substantially as hereinbefore described with reference to Figs. 1 to 5, so that the running out of the gun will be effected regularly and without any shock or jar. If desired, I use two or more recuperator-cylinders.

A further modification of my invention, which is particularly advantageous in the case of guns without trunnions, is shown in Figs. 16 to 19. The gun is secured in the transom E, between the brake-cylinders D, by means of a band or strap $h$, the said transom being formed with projections $i$ and grooves $i'$, as shown in Fig. 18, which fit corresponding grooves and projections on the body of the gun. In this case, as in Figs. 1, 2, and 3, the position of the gun and recoil-slide relatively to each other is always the same. The brake-cylinders D are connected by pipes or passages $a$ with a third cylinder L, in which works a hollow piston M. The rear end of the cylinder L forms with the hollow piston M an air-chamber. On the recoil taking place the liquid from the brake-cylinders D is forced into the cylinder L and drives the hollow piston M backward, thus compressing the air in the said chamber. When the recoil has ceased, the compressed air in the said chamber reacts and effects the return of the gun to the firing position.

A pump k, provided with an operating-lever k', is employed for running the gun out by hand when required. This pump is connected by pipes l with the cylinder L. It can be used, for instance, if from any cause the air has not been sufficiently compressed by the force of the recoil, to return the gun to the firing position. I can, if desired, use for this purpose air or liquid under pressure from an accumulator or reservoir.

A stop m, Figs. 17 and 18, is provided on each of the cheeks C C', to operate, in combination with a buffer or cushion n, on the turn-table B, for the purpose of preventing or diminishing any shock or concussion on depressing the gun to its lowest position. Stops o o', Fig. 17, are, moreover, provided on each of the cheeks C C', to operate, in combination with buffers or cushions p p', on the cylinders D, for the purpose of preventing or diminishing shock or concussion in the recoil and return movement of the gun and top carriage.

I sometimes provide for elevating the gun by means of a pinion geared with a circular rack formed or fixed on one of the cheeks C C', or by means of a worm geared with a worm-wheel or a segment of a worm-wheel formed on or attached to one of the said cheeks.

My improved gun-mounting is advantageously applicable to guns designed to be fired either in a horizontal position or at any desired angle of elevation, and it will be seen that the shock of the recoil is always transmitted through the brakes to the frame or under carriage, whatever be the angle of elevation of the gun.

What I claim is—

1. In a mounting for a breech-loading gun, the combination of a cradle or its equivalent in which the gun is mounted, and which is open at the rear to permit access to the breech of the gun, a top carriage having a bearing surface or slide upon which the said cradle is supported and moves in the recoil, and a base or under carriage upon which the said top carriage is supported and is arranged to turn about a horizontal axis extending through a point between the ends of the said bearing surface or slide, for the purposes above specified.

2. In a mounting for a breech-loading gun, the combination of a cradle or its equivalent in which the gun is mounted, and which is open at the rear to permit access to the breech of the gun, a top carriage having bearing-surfaces or slides upon which the said cradle is supported and moves in the recoil, an under carriage provided with bearing-surfaces on which the said top carriage is movable (for elevating the gun) through an arc of a circle the chord of which is in a plane extending through or parallel to the said bearing surfaces or slides on the top carriage, and a brake for controlling the recoil and return movement of the gun, for the purposes above specified.

3. In a gun-mounting, the combination of a cradle or frame in which the gun is rigidly secured, cheeks upon which the said cradle or frame is supported and arranged to slide, and an under carriage upon which the said cheeks are supported and are arranged to turn about a horizontal axis intersecting the longitudinal axis of the gun, substantially as and for the purposes set forth.

4. In a gun-mounting, the combination of a cradle or frame in which the gun is mounted, segmental cheeks upon which the said cradle or frame is supported and arranged to slide, an under carriage upon which the said cheeks are supported and are movable about a horizontal axis, a hydraulic brake for controlling the recoil movement of the said cradle upon the said cheeks, and a recuperator connected by suitable channels or passages with the cylinder of the said brake, for effecting the return movement of the said cradle after the recoil, substantially as and for the purposes set forth.

5. In a gun-mounting, the combination of a cradle or equivalent support for the gun, a segmental top carriage upon which the said cradle is supported and arranged to slide, an under carriage upon which the said top carriage is supported and is movable through an arc of a circle, and elevating mechanism comprising a screw fitted to rotate in a bearing attached to the said under carriage, and a nut in which the said screw works and which is attached to the top carriage, the said nut being made in halves, substantially as above described, so that the gun after being elevated may be released to permit its return to the loading position by gravity, as above specified.

6. In a gun-mounting, the combination of a cradle or equivalent support for the gun, a top carriage upon which the said cradle is supported and arranged to slide, an under carriage upon which the said top carriage is supported and is movable through an arc of a circle, an elevating-screw, a bearing in which the said screw is fitted to rotate and which is attached to the said under carriage so that it is capable of angular movement or adjustment, and a nut in which the said screw works and which is attached to the said top carriage so that it is capable of angular movement or adjustment, substantially as and for the purposes set forth.

7. In a gun-mounting, the combination of a cradle or equivalent support for the gun, a top carriage upon which the said cradle is supported and arranged to slide, an under carriage upon which the said top carriage is supported and is movable through an arc of a circle, an elevating-screw, a bearing in which the said screw is fitted to rotate and which is attached to the said under carriage so that it is capable of angular movement or adjustment, a nut in which the said screw works and which is attached to the said top carriage so that it is capable of angular movement or adjustment, and means, substantially such as above described, for releasing or disengaging the said nut from the said screw, substantially as and for the purposes set forth.

8. In a gun-mounting, the combination of a cradle for the gun, a top carriage provided with a bearing surface or slide upon which the said cradle is supported and moves in the recoil, an under carriage upon which the said top carriage is supported and is movable about a horizontal axis extending through a point between the ends of the said bearing surface or slide, a brake for controlling the movement of the said cradle upon the top carriage, and a recuperator connected with the said brake, and whereby the gun, after its recoil, will be automatically run out to the firing position at any angle of elevation, the center of gravity of the gun, cradle, and top carriage when the gun is run out being forward of the said horizontal axis, so that the gun will gravitate to the loading position, but being sufficiently near to the said axis to insure the gravitation of the gun to its firing angle when loaded, substantially as and for the purposes set forth.

9. In a gun-mounting, the combination of a cradle for the gun, a segmental top carriage upon which the said cradle is supported and arranged to slide, and an under carriage or turn-table provided with arc-shaped bearing-surfaces upon which the said top carriage is supported and against which the force of the recoil is exerted, substantially as and for the purposes set forth.

10. In a gun-mounting, the combination of a cradle for the gun, bearing surfaces or slides upon which the said cradle is supported and moves in the recoil, hydraulic brakes for controlling the recoil movement of the cradle on the said slides, and means, comprising a cylinder L, connected with the brake-cylinders, and a piston M, working in the said cylinder L, substantially as above described, for storing up energy during the recoil and utilizing such energy for effecting the return of the gun to its firing position, all substantially as set forth.

11. In a gun-mounting, the combination of a cradle for the gun, bearing surfaces or slides upon which the said cradle is supported and moves in the recoil, hydraulic brakes for controlling the recoil movement of the cradle on the slides, means, comprising a cylinder L, connected with the brake-cylinders, and a piston M, working in the said cylinder L, substantially as above described, for storing up energy during the recoil and utilizing such energy for effecting the return of the gun to its firing position, a loaded valve which permits the flow of liquid from the brakes into the said cylinder L, but prevents its return to the said brakes, and a by-pass provided with an adjustable valve for permitting and controlling the return of the liquid from the said cylinder to the brakes, all substantially as and for the purposes set forth.

12. The combination of the base-plate A, the turn-table or under carriage B, supported thereon, the segmental cheeks C C', supported on the said turn-table and arranged to turn about a horizontal axis, the cradle E, arranged to slide upon the said cheeks, hydraulic brakes D, for controlling the movement of the said cradle on the said cheeks, means, comprising a cylinder L, connected with the brake-cylinders, and a piston M, working in the said cylinder L, substantially as above described, for storing up energy during the recoil and utilizing it to effect the return of the gun to the firing position, and elevating mechanism comprising a screw-shaft P, a bearing Q, in which the said screw-shaft turns and which is secured in the under carriage, and a nut through which the said screw-shaft works and which is secured in one of the said cheeks, the said bearing and nut being capable of angular movement, all substantially as and for the purposes set forth.

13. The combination of the under carriage B, the cheeks C C', provided with bearing surfaces or slides and supported upon the said under carriage so that they are movable thereon through an arc of a circle, the cradle E, supported upon the said bearing surfaces or slides and arranged to move thereon in the recoil, the screw P, the bearing Q, in which the said screw is fitted to rotate and which is attached to the said under carriage so that it is capable of angular movement or adjustment, a nut in which the said screw works and which is formed in two parts connected by a hinge-joint and is attached to one of the said cheeks so that it is capable of angular movement or adjustment, the cam $f$, connected with the two parts of the said nut by screws $g$, extending through slots in the said cam, and the lever $f^2$, for operating the said cam, all substantially as and for the purposes set forth.

14. The combination of the under carriage B, provided with the arc-shaped bearing-surfaces H and with the rollers K, the segmental cheeks C C', provided with the brackets G and rollers G', the cradle E, provided with the brakes D, the piston-rods D' of which are fixed in the said brackets G, and means, substantially such as above described, for turning the said cheeks about a horizontal axis, substantially as and for the purposes set forth.

15. The combination of the under carriage B, the cheeks C C', the cradle E, provided with the hydraulic brakes D, means, comprising the cylinder L, connected with the brake-cylinders, and the piston M, working in the said cylinder L, substantially as above described, for storing up energy during the recoil and utilizing it for effecting the return of the gun to its firing position, the loaded valve O, and the by-pass $b$, provided with the adjustable valve $c$, all substantially as and for the purposes set forth.

In testimony whereof I have hereunto signed my name in the presence of two subscribing witnesses.

JEAN BAPTISTE GUSTAVE ADOLPHE CANET.

Witnesses:
ROBT. M. HOOPER,
R. J. PRESTON.